US007018136B2

(12) United States Patent
Van Bijsterveld et al.

(10) Patent No.: US 7,018,136 B2
(45) Date of Patent: Mar. 28, 2006

(54) METHOD INSTALLING A DUCT, DEVICE FOR CARRYING OUT SAID METHOD, AND A TAPE-SHAPE ELEMENT FOR USE WITH SAID METHOD

(75) Inventors: Cornelis Casparus Van Bijsterveld, Voorschoten (NL); Frank Martin Kerling, Leidschendam (NL)

(73) Assignee: Koninklijke KPN N.V., Groningen (NL)

( * ) Notice: Subject to any disclaimer, the term of this patent is extended or adjusted under 35 U.S.C. 154(b) by 75 days.

(21) Appl. No.: 10/450,020

(22) PCT Filed: Nov. 21, 2001

(86) PCT No.: PCT/EP01/13728

§ 371 (c)(1),
(2), (4) Date: Sep. 22, 2003

(87) PCT Pub. No.: WO02/50969

PCT Pub. Date: Jun. 27, 2002

(65) Prior Publication Data

US 2004/0037649 A1 Feb. 26, 2004

(30) Foreign Application Priority Data

Dec. 18, 2000 (NL) .................................. 1016894

(51) Int. Cl.
*F16L 55/18* (2006.01)

(52) U.S. Cl. .................. 405/184.1; 405/176; 29/33 K; 29/825

(58) Field of Classification Search ............. 405/184.1, 405/184.2, 184.3, 183.5, 176; 156/200, 201, 156/203, 466, 465, 461; 138/128, 118, 156
See application file for complete search history.

(56) References Cited

U.S. PATENT DOCUMENTS

| | | | | |
|---|---|---|---|---|
| 1,750,054 | A * | 3/1930 | Rosso | 111/111 |
| 2,144,872 | A * | 1/1939 | Cruser | 174/95 |
| RE24,613 | E * | 3/1959 | Hageltorn | 428/121 |
| 4,159,395 | A * | 6/1979 | Cogelia | 174/136 |
| 4,732,628 | A * | 3/1988 | Dienes | 156/48 |
| 4,806,043 | A * | 2/1989 | Fournier | 404/2 |
| 5,106,235 | A * | 4/1992 | King | 405/154.1 |
| 5,251,373 | A * | 10/1993 | DeCarlo et al. | 29/870 |
| 5,626,167 | A * | 5/1997 | Streit | 138/118.1 |
| 5,639,183 | A | 6/1997 | Griffioen et al. | 405/154 |
| 5,645,267 | A * | 7/1997 | Reeve et al. | 254/134.4 |
| 5,792,989 | A * | 8/1998 | Smith | 174/77 R |

(Continued)

FOREIGN PATENT DOCUMENTS

EP 0 292 037 11/1988

(Continued)

*Primary Examiner*—Heather Shackelford
*Assistant Examiner*—Gay Ann Spahn
(74) *Attorney, Agent, or Firm*—Michaelson & Associates; Peter L. Michaelson

(57) ABSTRACT

Method for installing a duct where an existing longitudinal member is present along a section over which the duct is to be installed. The longitudinal member is utilized as a guide for the duct. The tape-shaped element is closed around the longitudinal element through mating of complementary coupling devices longitudinally situated along the tape-shaped member so as to form a duct, with the coupled tape-shaped element then being propelled along the longitudinal element to extend the duct. The tape-shaped element can house an optical fiber cable. Through use of such a tape-shaped element, the duct, illustratively housing an optical fiber cable, can be formed around an existing (e.g. copper) telecommunications cable with any need to interrupt or remove that cable.

3 Claims, 3 Drawing Sheets

U.S. PATENT DOCUMENTS

| | | | | |
|---|---|---|---|---|
| 6,094,792 | A * | 8/2000 | Frye et al. | 29/33 K |
| 6,189,575 | B1 * | 2/2001 | Ions et al. | 138/106 |
| 6,219,907 | B1 * | 4/2001 | Frye | 29/825 |
| 6,337,440 | B1 * | 1/2002 | Ions et al. | 174/74 A |

FOREIGN PATENT DOCUMENTS

| | | |
|---|---|---|
| GB | 2 085 670 | 4/1982 |
| WO | WO 92/10869 | 6/1992 |

* cited by examiner

METHOD INSTALLING A DUCT, DEVICE FOR CARRYING OUT SAID METHOD, AND A TAPE-SHAPE ELEMENT FOR USE WITH SAID METHOD

BACKGROUND OF THE INVENTION

1. Field of the Invention

The invention relates to a method for installing a duct, a longitudinal member being present along the section over which the duct is to be installed, the present longitudinal element being made use of as a conductor for the duct to be installed, and the duct being propelled.

2. Description of the Prior Art

A method of installing a duct is known from U.S. Pat. No. 5,639,183. The known method is intended for installing—instead of an existing telecommunication cable lying in the ground, particularly a copper cable—a duct through which an optical cable may be conducted. In the event of said method, the existing cable is excavated at a suitable point, and cut through. The duct is slid over an end released in this manner. To install the duct in the soil surrounding the existing cable over a greater length, a liquid—e.g., water—is conducted through the duct under pressure; it washes away the ground around the existing cable, while at the same time the duct is pushed forward. In this manner, a duct, or a duct consisting of several coupled segments, may be installed underground over a great distance along an existing cable, without much excavation work being required for said purpose. After having been installed, the cable, if so desired, may be pulled out of the duct. One of the advantages of the known method is that curvy sections are easy to follow, without expensive positioning equipment.

It should be noted that, in the present application, the word "duct" signifies any tubular member, without restriction as to its application, although in the application, more specifically, applying the inclusion of telecommunication cables is dealt with. In this connection, it is not impossible that the duct has already been provided, in advance, with one or more cables.

The known method is particularly suitable for replacing the existing copper telecommunication cable with a cable duct in which an optical fibre cable may be installed for installing, e.g., fibre up to the user, i.e. up to the home or company. The optical fibre may be installed in the duct, e.g., by way of blowing or pulling, installing by way of blowing being preferred, since in this case the forces exercised are spread out over the entire length and damages as a result of excess tensile forces are prevented. Such a method for blowing in a cable is described in EP-A-0,292,037. A combination of blowing in and pulling is also possible by attaching, at the end of the optical fibre cable, a so-called shuttle.

Under certain circumstances, it is undesirable to cut through the existing cable in order to thus be capable of sliding the duct over it. Such is the case, e.g., if the cable must remain available for other purposes.

SUMMARY OF THE INVENTION

An object of the invention is to offer a solution for said problem.

According to a first aspect the invention therefore provides for a method of the aforementioned type, a tape-shaped element around the existing longitudinal element during propulsion being formed into a duct closed all around, by coupling to one another coupling means present at the longitudinal edges of the tape-shaped element.

According to a further object the invention provides for a tape-shaped element provided, along the longitudinal edges, with coupling means carried out, according to a preferred embodiment, as complementary closing members. Said closing members are, e.g., of the "Zip-lock" type, comprising a closing member having an upright, barbed longitudinal edge, and a closing member having a longitudinal slot in the walls for which openings have been mounted for encasing the barbs. Other coupling or closing systems, however, may also be applied, and are well-known to those skilled in the art.

It should be noted that a tubular member having a closing member of the type which is also applicable in the event of the tape-shaped element according to the invention, is known per se as an insulation for heating tubes. In this connection, the tube may be opened along a longitudinal cut to such an extent that it may be placed over the heating tube, and subsequently may be closed by way of the closing members around the tube.

The invention is based, among other things, on the insight that interrupting an existing cable is not required, when the duct to be applied around it is not initially closed all around, but is gradually folded around the cable from a tape shape during installation and, in doing so, is closed to the then opposite longitudinal edges of the tape-shaped element.

The existing cable may continue to be permanently in the ground and, in this case, is enclosed by the duct, which may have the advantage that, e.g., a cable having a lead sheating continues to be insulated with respect to the surrounding ground. It goes without saying that the existing cable may also be removed from the duct at any desired moment.

The use of a tape-shaped element for forming a duct has the additional advantage that significantly less space is required for storage, that the transport is simpler, and that it does not have the tendency to continue to be curved, as a tube would, as a result of winding it around a reel.

A further advantage is that a small bending radius is possible, as a result of which installation in smaller spaces poses no problem.

According to a preferred embodiment, the tape-shaped element is provided, over its length, with one or, preferably, several microducts. This offers numerous advantages. To start with, no separate microducts need be applied afterwards in the installed duct. Secondly, the microducts give the tape-shaped element additional rigidity in the event of it being pushed down into the ground, and in the third place the microducts, when they are located on the outside of the duct, may be interrupted in a simple manner, and released from the duct circumference. From such a microduct released from the duct, the required welds for, e.g., connections to homes, may be made. It is also possible to provide both sides of the tape-shaped element with microducts or, if the microducts are located to one side only, to form the closing members in such a manner that the tape-shaped element may be optionally closed with the microducts on the inside or the outside circumference of the duct.

The tape-shaped element may be manufactured of synthetic substance, e.g., of HDPE—high-density polyethylene. The tape may consist of several layers, if so desired, it being possible, e.g., to include an aluminium layer as water-retaining element.

Within the framework of the invention, it is also possible to implement the tape-shaped elements in such a manner that these are capable of being coupled in the transverse direction as well, by way of the closing members, as a result of which ducts having variable diameters may be formed by manufacturing them from one or several tape-shaped elements coupled sideways.

A further variant of the invention is a tape-shaped element having microducts, there already having been integrated preferably optical fibres or cables into the microducts; particularly the so-called plastic-optical-fibre (=POF) cable is suitable for this purpose.

According to a still further aspect the invention provides for a system for carrying out the method according to the invention, comprising means for supplying a tape-shaped element which is provided with longitudinal edges thereof which are capable of being mutually coupled, means for folding around a longitudinal element of the tape-shaped element and coupling to one another longitudinal edges, means for transporting, with respect to the longitudinal element, a tape-shaped element formed into a duct, and means for feeding a fluid to the front end of the duct. If the tape-shaped element is provided with microducts, the latter may be used for giving off the fluid towards the front end of the duct in order to sufficiently loosen the ground around the existing longitudinal element and/or to wash it away in order to make room for the duct.

BRIEF DESCRIPTION OF THE DRAWINGS

Below, the invention will be further clarified on the basis of exemplary embodiments with reference to the drawing. In it.

In the figures, similar components are indicated by the same reference numerals.

DETAILED DESCRIPTION

Figure 1:
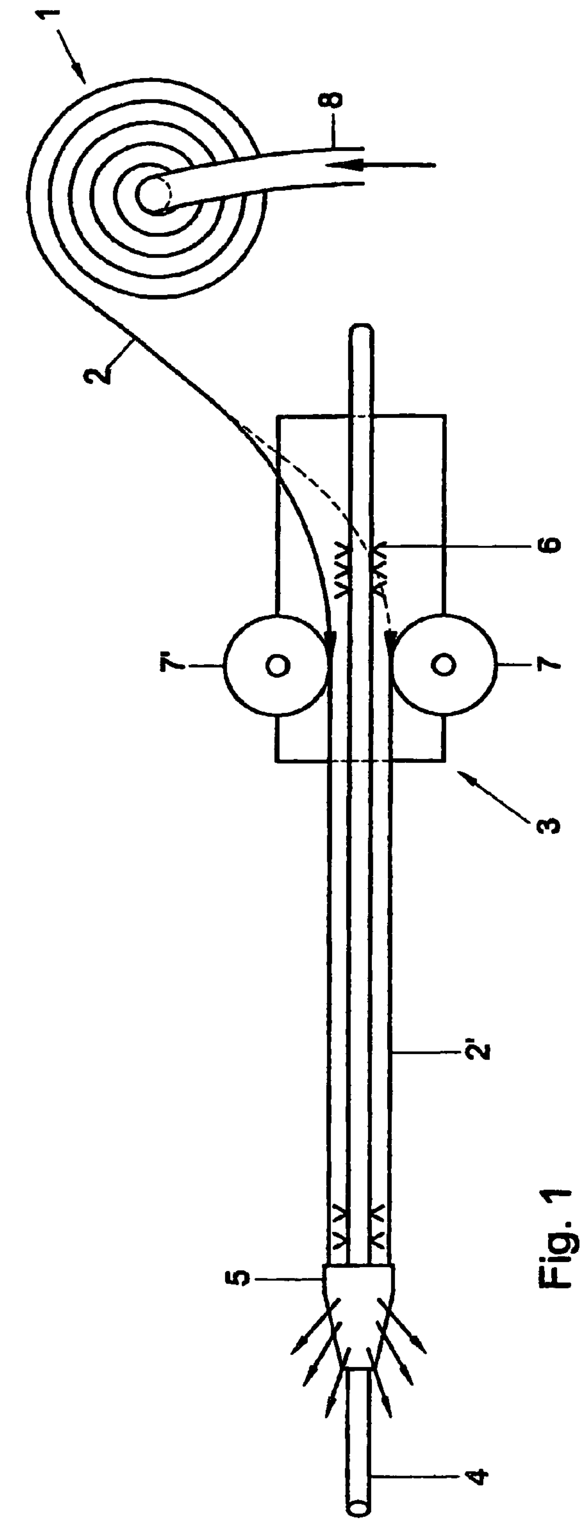
FIG. 1 shows a schematic view of an arrangement which is suitable for implementing the method according to the invention.

FIG. 1 shows a general schematic view of a device for carrying out the method according to the invention. In general, for further details relating to the present device, in so far as applicable, reference may be made to the aforementioned U.S. Pat. No. 5,639,183.

Figure 3:
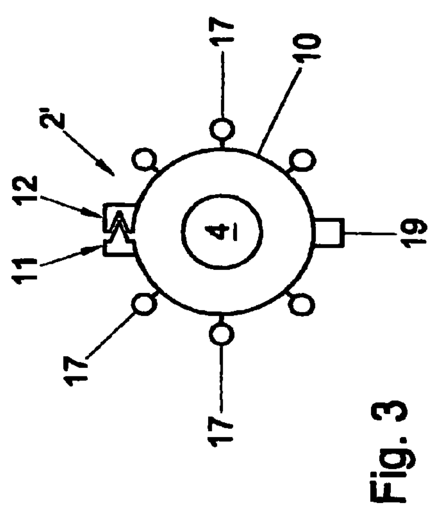
FIG. 3 shows a view in transverse section of a tape-shaped element according to FIG. 2, formed into a duct according to the invention.
Figure 2A:
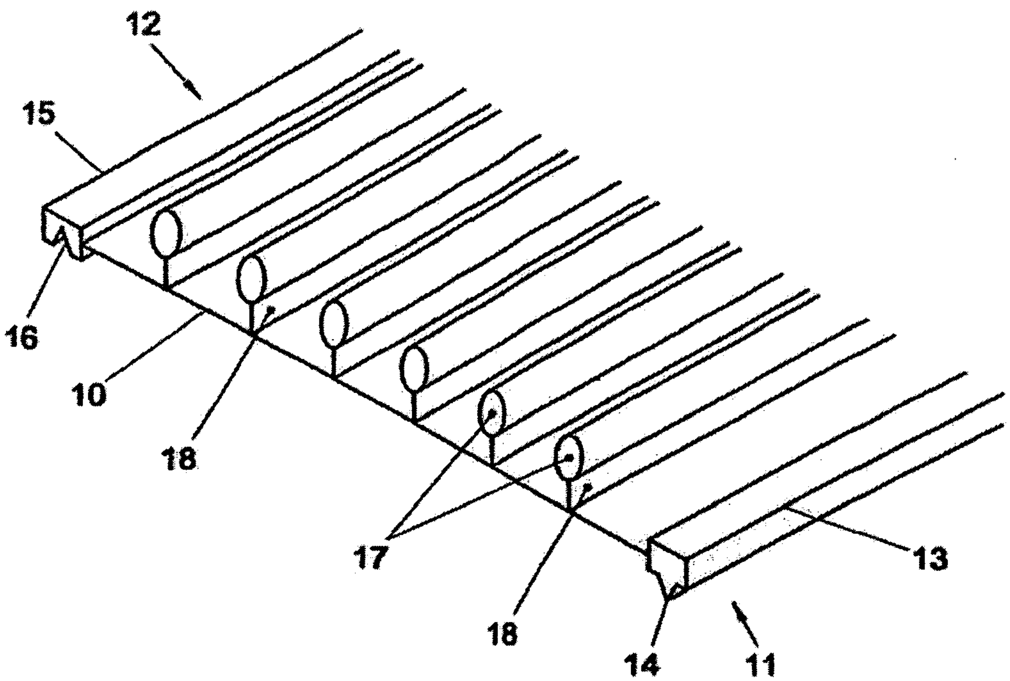
FIGS. 2*a* and 2*b* show views in perspective of a tape-shaped element according to the invention.
Figure 2B:
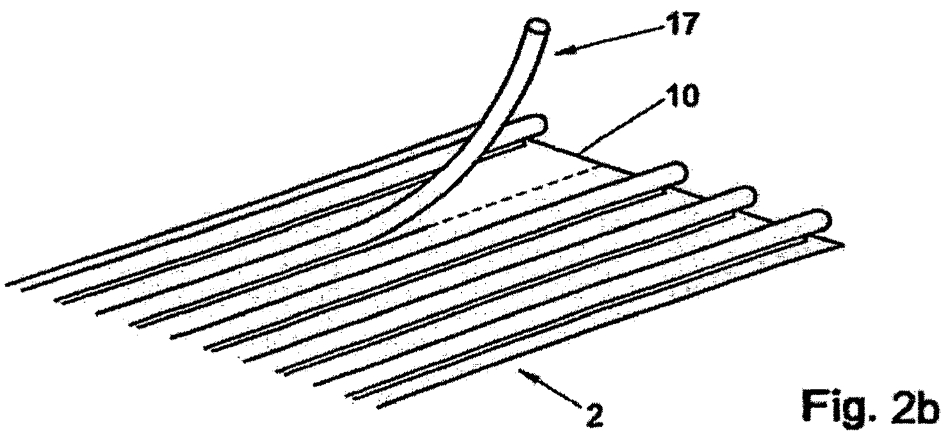

The device comprises a reel 1 on which a tape-shaped element 2, whose exemplary embodiment is shown in more detail in FIG. 2*a*, 2*b* and FIG. 3, has been wound. A closing and conveyor device 3, which is shown in more detail in FIG. 4, closes the tape-shaped element 2 into a duct 2' around an existing longitudinal element 4, such as a cable, located in the soil. For simplicity's sake, below there will be spoken of a cable 4, but it will be understood that the invention may also be applied with other longitudinal elements, such as, e.g., water or gas tubes. The device 3 is provided with means 6 for anchoring the device with respect to the cable 4 and thus preventing the device from shifting with respect to the cable 4 instead of the duct 2' around the cable. The device 3 is further provided with means of transport 7, 7', such as conveyor rollers or belts, serving to form the tape-shaped element 2 around the cable 4 into a duct 2', and to propel said duct along the cable. At the front end, the duct 2' is provided with a spouting headpiece 5, which is provided with openings through which a fluid under pressure may be conducted to loosen and/or widen the soil surrounding the headpiece 5 in order to free the way for the duct 2'. The fluid is, e.g., water or bentonite, which is fed to the reel 1 by way of a line 8. In the event of a tape-shaped element 2 which is provided with microducts to be dealt with below, the fluid may be conducted to the headpiece 5 by way of said microducts. If there are no microducts involved, the fluid is fed to the device 3 in order to be directly fed to the interior of the duct 2'.

FIG. 2*a* shows the tape-shaped element 2 in more detail. Said element consists of a carrier 10 which may consist of synthetic substance, such as HDPE, may consist of one and possibly of several layers having, e.g., an intermediate aluminium layer as water-retaining structure. The longitudinal edges of the carrier 10 are provided with coupling means in the form of closing members 11 and 12, which are complementary and may be, e.g., of the type which is applied as "Zip-lock" in the event of plastic bags. In this case, the closing member 11 consists of a body 13 having an elongated ridge 14 provided with barbs not shown, and the closing member 12 consists of a body 15 having an elongated slot 16 in which openings have been applied which are capable of co-operating with the barbs.

FIG. 3 shows a tape-shaped carrier 2 in the status of having been formed into a duct 2', the closing members 11 and 12 engaging with one another.

Preferably, the carrier 10 is provided with one or more microducts 17 which, either directly but preferably by way of a connecting ridge 18, are connected to the carrier 10. The advantage of applications of such a connecting ridge 18 is that a microduct 17 may be simple to release from the tape-shaped element, e.g., by cutting into the ridge, as is shown in FIG. 2*b*. Said releasing of a microduct from the duct 21 offers an advantage in the event of forming branchings to, e.g., homes.

The microducts 17 may be applied either to one side of the tape-shaped element 10 or on either side. If they are applied to one side, they may optionally come to lie along the internal circumference or the external circumference of the duct 2'.

The microducts 17 may be empty, so that an (optical) cable or fibre may be applied therein, but may also be provided in advance with, e.g., plastic optical fibre or other optical fibres or cables. The diameter of the microduct 17 is, e.g., 5–7 mm.

Figure 5:
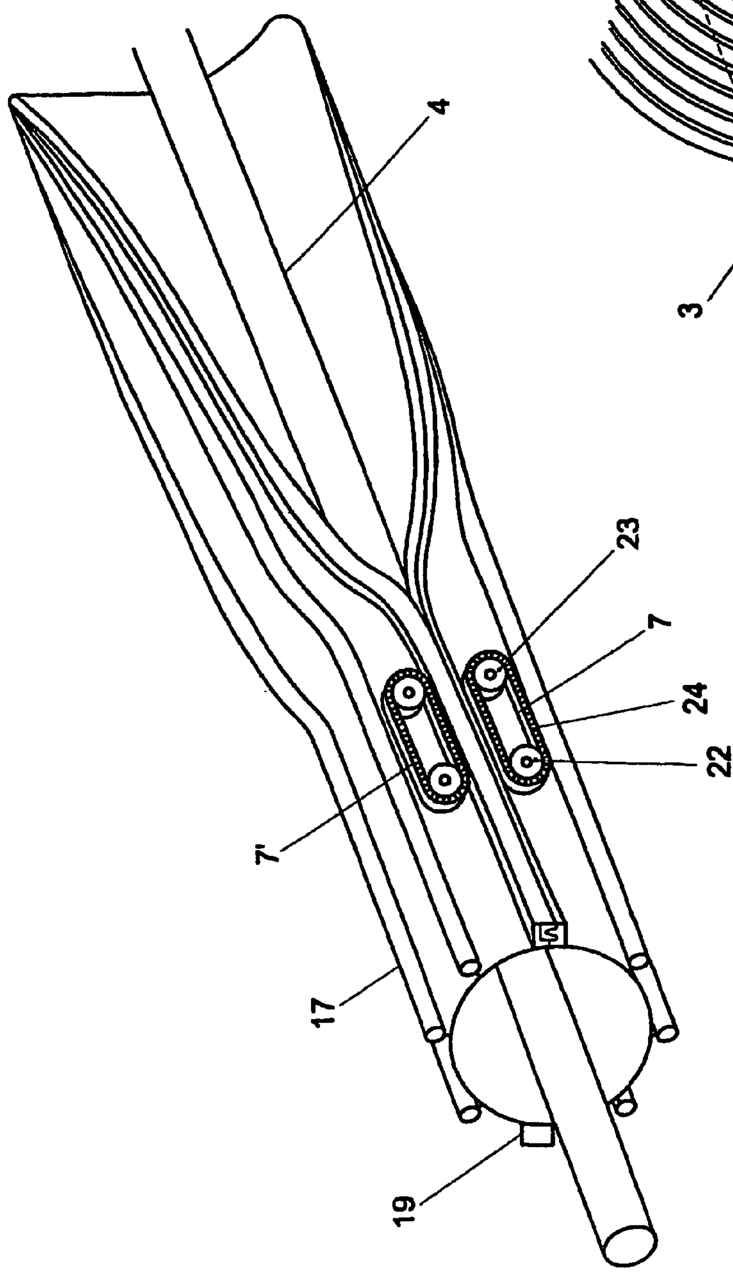
FIG. 5 shows a schematic view of means for closing the tape-shaped element into a duct, and propelling the duct formed in this manner.

The carrier 10 is preferably provided with a longitudinal ridge 19 shown only in FIGS. 3 and 5, which is applied at the location of any of the microducts 17 and which, just as the closing members 11, 12, serves to be engaged by the means of transport 7, 7' to propell the duct 2'. By carrying out said propulsion on either side of the duct, a regular transport takes place.

Figure 2C:
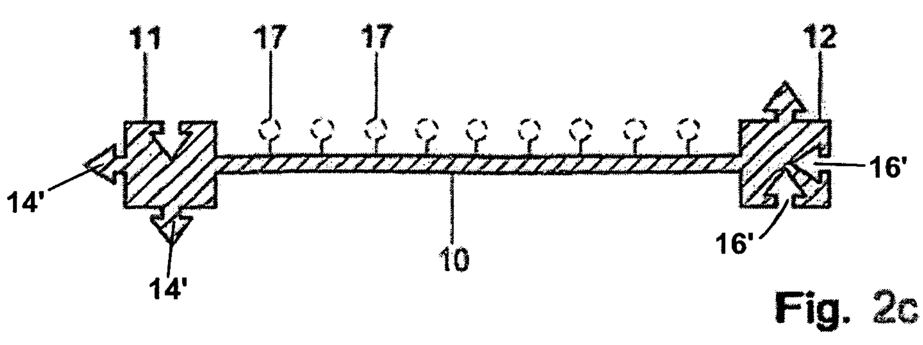
FIG. 2*c* shows variants of the closing members.

FIG. 2*c* schematically shows variants of the closing members, which facilitate the optional closure of the tape-shaped element 2 in several ways, namely, having the microduct at the internal or external side, and to couple the tape-shaped element transversely in order to be capable of thus manufacturing ducts having variable diameters. To this end, the closing members 11 and 12 may be provided with two further elongated ridges 14' and two corresponding elongated slots 16' respectively parallel to and transversely oriented to a plane of carrier 10. It goes without saying that each of said options may be separately applied.

Figure 4:
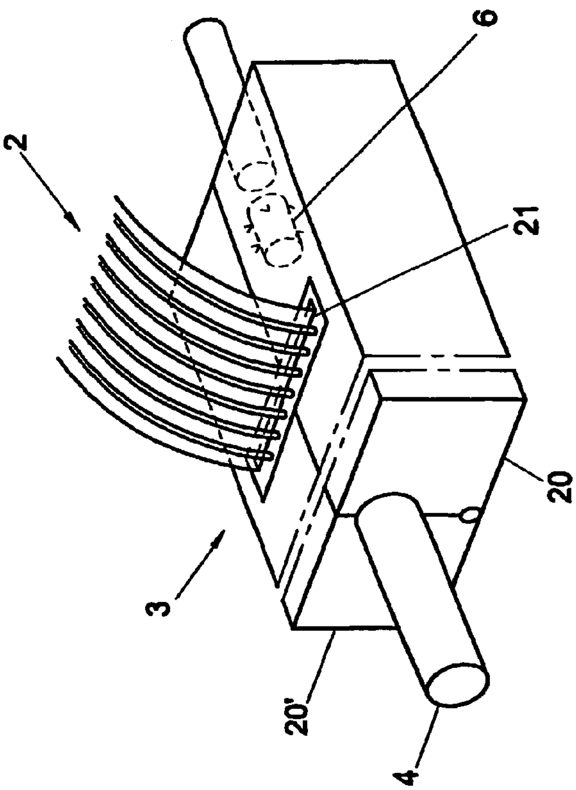
FIG. 4 shows a schematic view of a possible device for forming a duct out of a tape-shaped element.

FIG. 4 shows, in more detail, the device 3 consisting of 2 pivotably connected parts 20, 20' in order to be capable of placing the device around the cable 4. Moreover, the device is provided with an input opening 21, by way of which the tape-shaped element 2 is conducted into the device. The shape of the opening 21 may be adjusted to the width of the tape-shaped element 2 and to the number of microducts 17 present.

FIG. 5 shows a possible embodiment of means of transport 7, 7' for closing the closing members 11 and 12 of the tape-shaped element 2, and for propelling the duct formed after closure. The means 7, 7' and the pair of means of transport engaging with the ridge 19, not shown, located on the opposite side of the duct, each consist of a pair of drive wheels 22, 23 and a conveyor belt 24 running around it. It goes without saying that other closing means and means of transport are possible, and that there is provided for a drive for the wheels 22, 23. It is also possible to apply closing means only and to have the transport of the duct 2' carried out along the cable 4 by the headpiece 5. For this purpose, the headpiece 5 may be realised, e.g., as a drill bit. Other ways of propelling the duct, too, are imaginable, e.g., by way of mechanical tensile force, manual pushing or pulling force etc. Over shorter sections, the tape-shaped element may be pulled, e.g., with manual force through the device 3 in order to form a duct around an existing cable.

The invention claimed is:

1. A method for installing a duct, a longitudinal element being present along a section over which the duct is to be installed, the longitudinal element being utilized as a guide for the duct to be installed, the method comprising the steps of:

supplying a tape-shaped element;

forming the tape-shaped element around the existing, longitudinal element, thus forming a duct closed circumferentially around the longitudinal element, by coupling to one another closing members present at longitudinal edges of the tape-shaped element; and propelling the duct over the longitudinal element;

wherein, to form a branch in the duct, the tape-shaped element has a carrier provided on at least one side thereof, with a number of microducts, one of the microducts being cut and released from the circumference of the duct.

2. The method recited in claim 1 wherein a fluid is fed through the duct to a front end of the duct.

3. The method recited in claim 1 wherein a fluid is fed through at least one of the microducts.

* * * * *